United States Patent
Ahn

(10) Patent No.: US 9,490,489 B2
(45) Date of Patent: Nov. 8, 2016

(54) DEVICE FOR MANUFACTURING FUEL CELL STACK COMPONENTS

(71) Applicant: Hyundai Motor Company, Seoul (KR)

(72) Inventor: Sang Yeoul Ahn, Seoul (KR)

(73) Assignee: Hyundai Motor Company, Seoul (KR)

( * ) Notice: Subject to any disclaimer, the term of this patent is extended or adjusted under 35 U.S.C. 154(b) by 548 days.

(21) Appl. No.: 14/108,000

(22) Filed: Dec. 16, 2013

(65) Prior Publication Data

US 2014/0305596 A1 Oct. 16, 2014

(30) Foreign Application Priority Data

Apr. 12, 2013 (KR) .......................... 10-2013-0040486

(51) Int. Cl.
| | |
|---|---|
| *B32B 37/00* | (2006.01) |
| *H01M 8/02* | (2016.01) |
| *H01M 8/10* | (2016.01) |

(52) U.S. Cl.
CPC ......... *H01M 8/0297* (2013.01); *H01M 8/1004* (2013.01); *B32B 37/0046* (2013.01); *Y02E 60/521* (2013.01); *Y02P 70/56* (2015.11)

(58) Field of Classification Search
CPC ............ H01M 8/0297; H01M 8/1004; B32B 37/0046
USPC ...................................... 156/580, 581, 583.1
See application file for complete search history.

(56) References Cited

U.S. PATENT DOCUMENTS

| | | | |
|---|---|---|---|
| 8,465,832 B2* | 6/2013 | Jones | ............................ 156/305 |
| 2007/0029688 A1* | 2/2007 | Delaney | .................. B29C 63/36 264/36.15 |
| 2009/0165927 A1* | 7/2009 | Driver | ..................... B29C 63/36 156/94 |
| 2010/0261000 A1* | 10/2010 | Jones | .................. B29C 44/1228 428/313.5 |
| 2010/0291370 A1* | 11/2010 | Jones | .................... B29C 44/445 428/314.8 |

FOREIGN PATENT DOCUMENTS

| | | |
|---|---|---|
| JP | 2006-147231 A | 6/2006 |
| KR | 10-2011-0108570 A | 10/2011 |

* cited by examiner

*Primary Examiner* — James Sells
(74) *Attorney, Agent, or Firm* — McDermott Will & Emery LLP

(57) ABSTRACT

An apparatus for manufacturing fuel cell stack components integrally bond gas diffusion layers to both surfaces of a membrane-electrode assembly (MEA) basic material in which a membrane-electrode assembly has sub gaskets. The apparatus includes a frame, an upper die disposed on the frame to be movable in a vertical direction, and a lower die disposed on the frame, and configured to support the MEA basic material and the gas diffusion layers at a lower side of the upper die. Bonders are installed at each of the upper die and the lower die and configured to compress the MEA basic material and the gas diffusion layers at a high temperature and a high pressure. Steam injectors are disposed at the bonders and configured to inject steam to the MEA basic material and the gas diffusion layers. An ultra-pure water storage tank configured to stores ultra-pure water for generating the steam by the bonders and supplies the ultra-pure water to the bonders.

11 Claims, 6 Drawing Sheets

(The prior art)

(The exemplary embodiment of the present invention)

DEVICE FOR MANUFACTURING FUEL CELL STACK COMPONENTS

CROSS-REFERENCE TO RELATED APPLICATION

This application claims the benefit of priority to Korean Patent Application No. 10-2013-0040486 filed in the Korean Intellectual Property Office on Apr. 12, 2013, the entire contents of which are incorporated herein by reference.

TECHNICAL FIELD

The present disclosure relates to a system for manufacturing fuel cell stack components, and more particularly, to a system for manufacturing fuel cell stack components for integrally bonding a gas diffusion layer (GDL) to a membrane-electrode assembly (MEA) having sub gaskets.

BACKGROUND

As is known, a fuel cell generates electricity by an electrochemical reaction of hydrogen and oxygen. The fuel cell receives a chemical reactant from the outside even without a separate charging process and generates a continuous power.

The fuel cell may be formed by disposing separators (separation plates or bipolar plates) at both sides of a membrane-electrode assembly (MEA) with the membrane-electrode assembly interposed there between. A plurality of fuel cell sheets may be continuously arranged to form a fuel cell stack.

In the membrane-electrode assembly, which is a core component of the fuel cell stack, an anode electrode layer (catalyst layer) is formed on one surface of an electrolyte membrane, and a cathode electrode layer (catalyst layer) is formed on another surface thereof with the electrolyte membrane interposed there between.

Sub gaskets for protecting the electrode layers and the electrolyte membrane and securing an assembly property of the fuel cell are bonded to edge portions of the respective electrode layers of the membrane-electrode assembly. In the meantime, gas diffusion layers (GDL) for diffusing reacted gas of hydrogen and oxygen are integrally bonded to the electrode layers of the membrane-electrode assembly, respectively.

The fuel cell stack components including the membrane-electrode assembly, the sub gaskets, and the gas diffusion layers may be manufactured by integrally bonders of the sub gaskets to the membrane-electrode assembly to which the sub gaskets are bonded (hereinafter, referred to as an "MEA basic material" for convenience), and integrally bonding the gas diffusion layers to the entire surface of the electrode layer.

In general, a method of bonding the gas diffusion layers to the MEA basic material employs, for example, a hot press device for compressing the MEA basic material and the gas diffusion layers at a high temperature and a high pressure in a state where the gas diffusion layers are disposed on both surfaces of the MEA basic material, and integrally bonding the MEA basic material and the gas diffusion layers.

However, in a case where the MEA basic material and the gas diffusion layers are compressed at the high temperature and the high pressure by using the hot press device, moisture of the sub gasket is evaporated by heat applied from the hot press device, and thereby contracting and forming wrinkles on the surface of the sub gasket. The wrinkles on the surface of the sub gasket cause a leakage of reacted gas when the fuel cell stack is manufactured, thereby deteriorating performance of the fuel cell stack.

The membrane-electrode assembly includes a platinum catalyst and an ion conductive polymer film such as Nafion, and the ion conductive polymer film needs sufficient moisture therein in order to secure ion conducting performance.

However, most of the moisture inside the ion conductive polymer film evaporates during the compression process at the high temperature and the high pressure by the hot press device, so that the membrane-electrode assembly loses its inherent ion conducting performance. Accordingly, after the fuel cell stack is manufactured, it is necessary to re-supply sufficient moisture to the ion conductive polymer film through an activation process of the membrane-electrode assembly.

When the activation process of the membrane-electrode assembly is conducted after the fuel cell stack is manufactured, hydrogen and electric energy are rapidly consumed, and as a result, manufacturing cost of the fuel cell stack is increased, and a manufacturing cycle time is unavoidably increased.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides an apparatus for manufacturing fuel cell stack components, which supplies steam to a membrane-electrode assembly provided with sub gaskets and gas diffusion layers when the membrane-electrode assembly having the sub gaskets and the gas diffusion layers are thermally compressed so as to secure a quality of a bonded component including the membrane-electrode assembly, the sub gaskets, and the gas diffusion layers.

An exemplary embodiment of the present disclosure provides an apparatus for manufacturing fuel cell stack components for integrally bonding gas diffusion layers to both surfaces of a membrane-electrode assembly (MEA) basic material, the MEA basic material having an MEA and sub gaskets. The apparatus includes a frame, an upper die disposed on the frame to be movable in a vertical direction, and a lower die disposed on the frame and configured to support the MEA basic material and the gas diffusion layers at a lower side of the upper die. Bonders are disposed at each of the upper die and the lower die and configured to compress the MEA basic material and the gas diffusion layers at a high temperature and a high pressure. Steam injectors are disposed in the bonders and configured to inject steam to the MEA basic material and the gas diffusion layers. An ultra-pure water storage tank is configured to store ultra-pure water for generating steam to the bonders and supplies the ultra-pure water to the bonders.

The ultra-pure water storage tank may supply the ultra-pure water to a high temperature portion of each of the bonders, and the steam injectors may inject the steam evaporated from the high temperature portion.

The bonders may include hot plates compressing the gas diffusion layers to both surfaces of the MEA basic material.

The steam injectors may include a plurality of steam nozzle holes formed in the hot plates.

The ultra-pure water storage tank may supply the ultra-pure water to the hot plates through an ultra-pure water supply line. The steam injectors may inject the steam evaporated from the hot plates through the steam nozzle holes.

An opening/closing valve operated by an electrical signal may be installed in the ultra-pure water supply line.

Another exemplary embodiment of the present disclosure provides an apparatus for manufacturing fuel cell stack components for integrally bonding gas diffusion layers to both surfaces of a membrane-electrode assembly (MEA) basic material having an MEA and sub gaskets. The apparatus includes a frame, an upper die disposed on the frame to be movable in a vertical direction, and a lower die disposed on the frame and configured to support the MEA basic material and the gas diffusion layers at a lower side of the upper die. Bonders are disposed at each of the upper die and the lower die and configured to compress the MEA basic material and the gas diffusion layers at a high temperature and a high pressure. Steam injectors are disposed in the bonders and inject steam to the MEA basic material and the gas diffusion layers. A steam generator is connected to the steam injectors and configured to generate the steam by heating ultra-pure water, and supply the generated steam to the steam injectors.

The bonders may include hot plates compressing the gas diffusion layers to both surfaces of the MEA basic material. The steam injectors may include a plurality of steam nozzle holes formed in a hot plate.

The steam generator may include a storage tank to store the ultra-pure water, and a heater to generate steam by receiving the ultra-pure water stored in the storage tank. A steam supply line supplies the steam generated by the heater to the steam nozzle holes of the hot plates.

An opening/closing valve operated by an electric signal may be disposed at the steam supply line.

The steam nozzle holes may be formed in the hot plates, except for an area corresponding to a bonding portion of the sub gasket and the gas diffusion layer.

According to exemplary embodiments of the present disclosure, it is possible to supply moisture to the membrane-electrode assembly including a platinum catalyst and an ion conductive polymer film, such as Nafion, when thermally compressing the membrane-electrode assembly and the gas diffusion layers using the hot plates. Thus, a time and cost for an additional activation process are considerably decreased due to evaporation and loss of the moisture in the membrane-electrode assembly for the existing thermal compression process.

Further, according to exemplary embodiments of the present disclosure, the steam of the moisture is supplied to the surfaces of the sub gaskets of the membrane-electrode assembly when the membrane-electrode assembly and the gas diffusion layers are thermally compressed using the hot plates, so that it is possible to prevent the surfaces of the sub gaskets from having a wrinkle shape while being contracted.

Since the present disclosure can prevent the wrinkle on the surfaces of the sub gaskets as described above, it is possible to remarkably decrease a leak generation rate of reacted gas due to the wrinkle, thus increasing a performance stability of the fuel cell stack.

BRIEF DESCRIPTION OF THE DRAWINGS

The drawings are for reference to describing the exemplary embodiments of the present disclosure, and it shall not be construed that the technical spirit of the present disclosure is limited to the accompanying drawings.

DETAILED DESCRIPTION OF THE EMBODIMENTS

Figure 1:
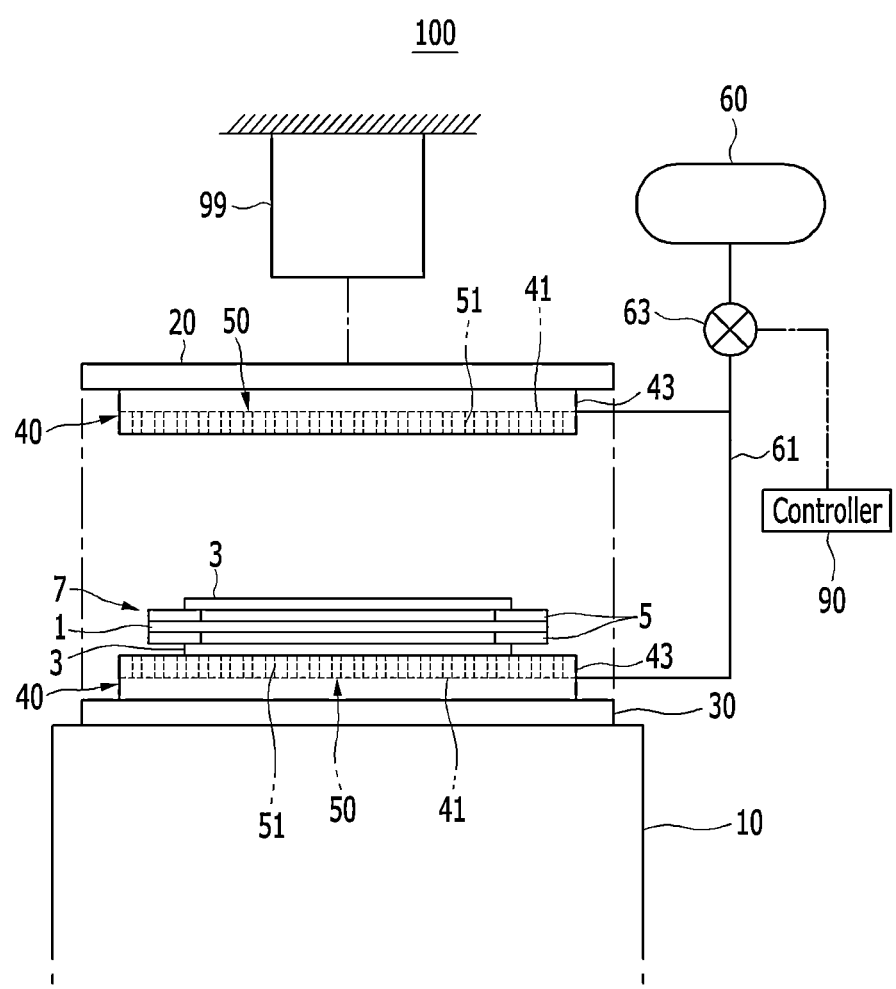
FIG. 1 is a diagram schematically illustrating an apparatus for manufacturing fuel cell stack components according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

A part irrelevant to the description will be omitted to clearly describe the present disclosure, and the same elements will be designated by the same reference numerals throughout the specification.

The size and thickness of each configuration shown in the drawings are arbitrarily shown for understanding and ease of description, but the present disclosure is not limited thereto, and the thickness of layers, films, panels, regions, etc., are exaggerated for clarity.

In the following detailed description, names of constituents, which are in the same relationship, are divided into "the first", "the second", and the like, but the present disclosure is not limited to the order in the following description.

Throughout the specification, unless explicitly described to the contrary, the word "comprise" and variations, such as "comprises" or "comprising," will be understood to imply the inclusion of stated elements but not the exclusion of any other elements.

FIG. 1 is a diagram schematically illustrating an apparatus for manufacturing fuel cell stack components according to an exemplary embodiment of the present disclosure.

Referring to FIG. 1, an apparatus 100 for manufacturing fuel cell stack components according to an exemplary embodiment of the present disclosure may be applied to automated equipment manufacturing components of a unit fuel cell configuring a fuel cell stack.

For example, the components of the unit fuel cell may include a membrane-electrode assembly 1 (hereinafter, referred to as an "MEA" for convenience) and gas diffusion layers 3 (hereinafter, referred to as a "GDL" for convenience) bonded to both surfaces of the MEA 1.

The MEA 1 is formed of an anode electrode layer on one surface of an electrolyte membrane and a cathode electrode layer on the other surface of the electrolyte membrane. The GDL 3 may be bonded (adhered) to each of the anode electrode layer and the cathode electrode layer of the MEA 1.

Sub gaskets 5 formed of polyester polymers for protecting the electrode layers and the electrolyte membrane and securing an assembly property of the fuel cell are bonded to the MEA 1. Further, the GDL 3 may integrally bond to the part of the sub gasket 5 and the entire surface of the electrode layer.

Hereinafter, a part obtained by bonding the sub gaskets 5 to the MEA 1 will be defined as an "MEA basic material 7", and a part obtained by integrally bonding the GDL 3 to the MEA basic material 7 will be defined as a bonded component.

The apparatus 100 for manufacturing the fuel cell stack components according to an exemplary embodiment of the present disclosure may be applied to a manufacturing process of the bonded component by thermally compressing the GDLs 3 to both surfaces of the MEA basic material 7.

The apparatus 100 for manufacturing the fuel cell stack components according to an exemplary embodiment of the present disclosure can supply steam to the MEA 1 having the sub gaskets 5 and the GDLs 3 when thermally compressing the MEA 1 and the GDLs 3 so as to secure a quality of the bonded component including the MEA 1, the sub gaskets 5, and the GDLs 3.

The apparatus 100 for manufacturing the fuel cell stack components according to an exemplary embodiment of the present disclosure basically includes a frame 10, an upper die 20, a lower die 30, bonders 40, and steam injectors 50.

The frame 10 supports various constituent elements and may include attached elements, such as, various brackets, a support block, a plate, a housing, a cover, a collar, and a rod.

However, the attached elements are for the purpose of installing each constituent element to the frame 10, and in an exemplary embodiment of the present disclosure, the attached elements are collectively called the frame 10 in principle, except for an exceptional case.

The upper die 20 disposed on the frame 10 may be movable in a vertical direction. Here, the upper die 20 may be disposed on the frame 10 to be movable in the vertical direction through a driving unit 99.

The upper die 20 moves the vertical direction through a guide road (not illustrated in the drawing) provided on the frame 10 and may move in the vertical direction by a driving force from the driving unit 99.

The driving unit 99 is an upper die driving device of a press facility widely known in this field, and may include, for example, an actuator, such as a hydraulic/air pressure cylinder and a servo motor.

The lower die 30 supports the MEA basic material 7 and the GDL 3, which are integrally bonded thereto, and is disposed at a lower side of the upper die 20 and is mounted to the frame 10.

According to an exemplary embodiment of the present disclosure, the bonders 40 are for the purpose of bonding the GDLs 3 to both surfaces of the MEA basic material 7. The MEA basic material 7 and the GDLs 3 are disposed on the lower die 30 with an applied pressure of the upper die 20 and move down by the driving unit 99 at a high temperature and a high pressure. The bonders 40 are disposed on the upper die 20 and the lower die 30, respectively.

The bonders 40 include hot plates 41 compressing the GDLs 3 to both surfaces of the MEA basic material 7. The hot plate 41 may be, for example, a hot plate generating heat with an electrical resistance.

The hot plates 41 are disposed in separate housings 43 provided in the upper die 20 and the lower die 30, respectively, and compressing surfaces of the MEA basic material 7, and the GDLs 3 are exposed to the outside of the housings 43, and may be disposed while facing each other.

Since the aforementioned hot plate 41 has a configuration of a hot press of a publicly known technique widely known to the business field, a more detailed description of the configuration thereof will be omitted in the present specification.

According to an exemplary embodiment of the present disclosure, the steam injector 50 injects steam generated from the hot plates 41 to the MEA basic material 7 and the GDLs 3 in a compressing process of the MEA basic material 7 and the GDLs 3 through the hot plates 41 of the upper and lower dies 20 and 30 while the upper die 20 moves down toward the lower die 30. An operation of generating steam by the hot plates 41 will be described in more detail below.

Figure 2:
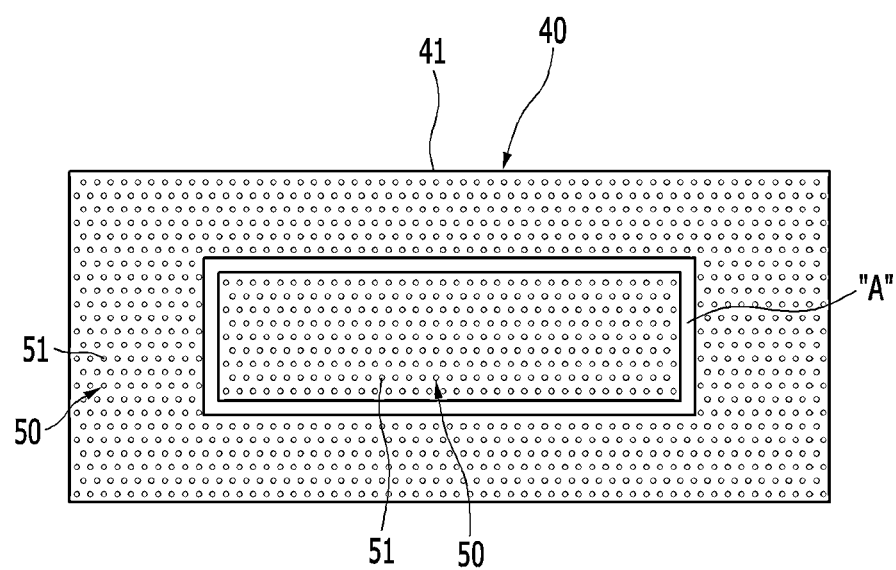
FIG. 2 is a diagram schematically illustrating a steam injector of a hot plate applied to an apparatus for manufacturing fuel cell stack components according to an exemplary embodiment of the present disclosure.

The steam injector 50 includes a plurality of steam nozzle holes 51 formed in the hot plates 41 of the upper and lower dies 20 and 30 as illustrated in FIG. 2.

The steam nozzle holes 51 may be formed of a plurality of holes passing through the hot plate 41, may have the same diameter in a width direction of the hot plate 41, and may also be formed in a diameter which is gradually decreased from one side to the other side.

Further, the steam nozzle holes 51 may be formed in the hot plate 4, except for an area corresponding to a bonding portion of the sub gasket 5 and the GDL 3 (area "A" in FIG. 2). Since the GDL 3 is bonded to a part of the sub gasket 5, the steam nozzle holes 51 are not formed at the area corresponding to the bonding portion of the sub gasket 5 and the GDL 3 in order to prevent deteriorating there between from bonding force.

The apparatus 100 for manufacturing the fuel cell stack components according to an exemplary embodiment of the present disclosure includes an ultra-pure water storage tank 60 for storing water, for example, ultra-pure water, and supplying the ultra-pure water to the hot plates 41 as a steam generating means for generating steam by the hot plates 41.

That is, in an exemplary embodiment of the present disclosure, when the ultra-pure water is supplied to the hot plate 41 from the ultra-pure water storage tank 60, the steam generated while the ultra-pure water is evaporated by heat of the hot plate 41 may be injected to the MEA basic material 7 and the GDL 3 through the steam nozzle holes 51 of the hot plate 41.

Here, the ultra-pure storage tank 60 may be connected to the housings 43 through an ultra-pure water supply line 61 in order to provide the ultra-pure water to the hot plate 41. The ultra-pure water stored inside the ultra-pure water storage tank 60 may be supplied to the hot plate 41 by a pump (not shown here), and may also be supplied to the hot plate 41 by a pressure difference.

An opening/closing valve 63 is operated by an electrical signal provided from a controller 90 and is installed in the ultra-pure water supply line 61. The opening/closing valve 63 may open the ultra-pure water supply line 61 through the controller 90 when the MEA basic material 7 and the GDLs 3 are compressed through the hot plates 41 of the upper and lower dies 20 and 30 while the upper die 20 moves down toward the lower die 30.

Further, the opening/closing valve 63 may close the ultra-pure water supply line 61 through the controller 90 when the MEA basic material 7. The GDLs 3 are completely compressed at a high temperature by the hot plates 41, and then the upper die 20 moves up.

Hereinafter, an operation of the apparatus 100 for manufacturing fuel cell stack components according to an exemplary embodiment of the present disclosure, which is configured as described above, will be described in detail with reference to the previously disclosed drawings and the accompanying drawings.

Figure 3:
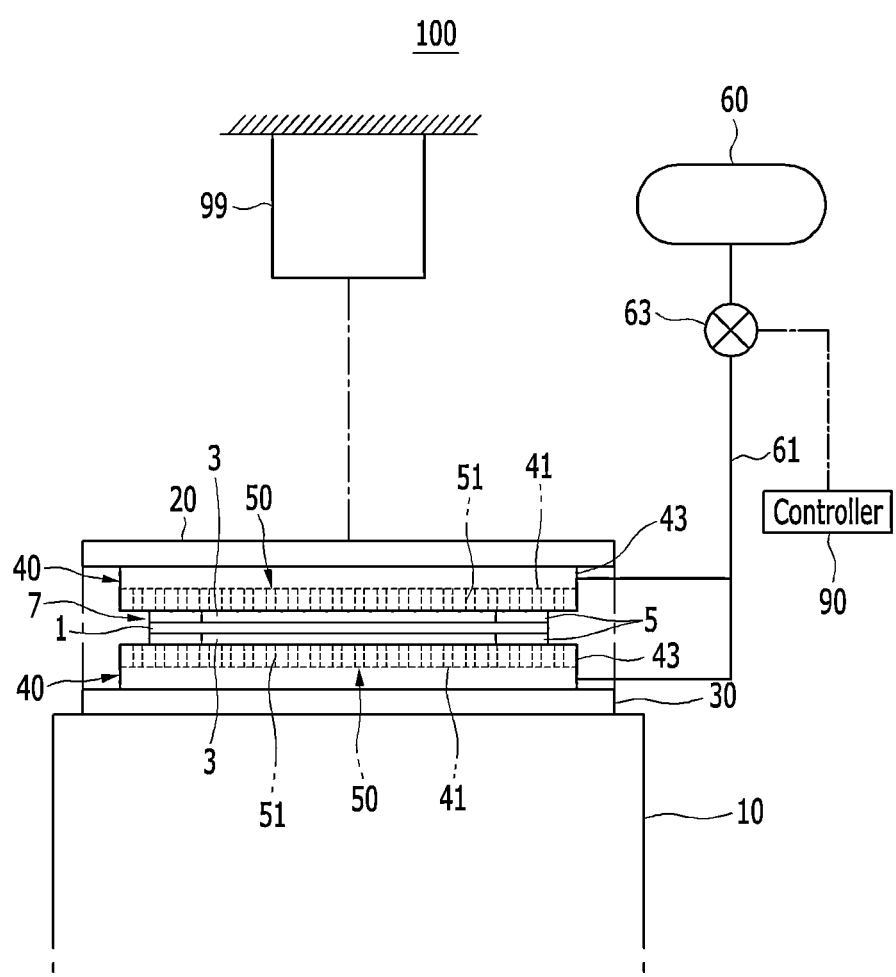
FIG. 3 is a diagram for describing an operation of an apparatus for manufacturing fuel cell stack components according to an exemplary embodiment of the present disclosure.

FIG. 3 is a diagram for describing an operation of an apparatus for manufacturing fuel cell stack components according to an exemplary embodiment of the present disclosure.

Referring to FIG. 1, in an exemplary embodiment of the present disclosure, the upper die 20 is in a state of moving in an upper direction by the driving unit 99.

Here, the ultra-pure water supply line 61 connecting the ultra-pure water storage tank 60 and the housing 43 of the hot plate 41 is in a closed state by the opening/closing valve 63 operated by receiving the electrical signal from the controller 90.

In the exemplary embodiment of the present disclosure, in this state, the GDL 3, the MEA basic material 7, and the other GDL 3 are picked up, and sequentially loaded on the hot plate 41 of the lower die 30 through a separate transfer means, such as a robot.

After the aforementioned process is performed, in an exemplary embodiment of the present disclosure, the upper die 20 is moved toward the lower die 30 through the driving unit 99 as illustrated in FIG. 3. In this case, the hot plates 41 of the upper die 20 and the lower die 30 are in a preheated state at a predetermined temperature.

When the upper die 20 moves down toward the lower die 30 through the driving unit 99, the GDLs 3 and the MEA basic material 7 stacked each other on the lower die 30 are compressed at a high temperature by the hot plates 41 of the upper die 20 and the lower die 30 with the applied pressure of the upper die 20.

In this process, in an exemplary embodiment of the present disclosure, the ultra-pure water supply line 61 is opened by operating the opening/closing valve 63 by applying an electrical signal to the opening/closing valve 63 through the controller 90.

Then, the ultra-pure water stored in the ultra-pure water storage tank 60 is supplied to the housings 43 of the hot plates 41 through the ultra-pure water supply line 61, and evaporated by heat of the hot plates 41 inside the housings 43.

Steam of the ultra-pure water evaporated from the hot plates 41 of the upper and lower dies 20 and 30 is injected to the MEA basic material 7 and the GDLs 3 through the steam nozzle holes 51 of the hot plates 41.

According to an exemplary embodiment of the present disclosure, it is possible to provide steam to the GDLs 3 and the MEA basic material 7, which are bonded to each other, when compressing the GDLs 3 and the MEA basic material 7 stacked each other on the lower die 30 at the high temperature through the hot plates 41 of the upper die 20 and the lower die 20 with the applied pressure of the upper die 20.

Figure 4:
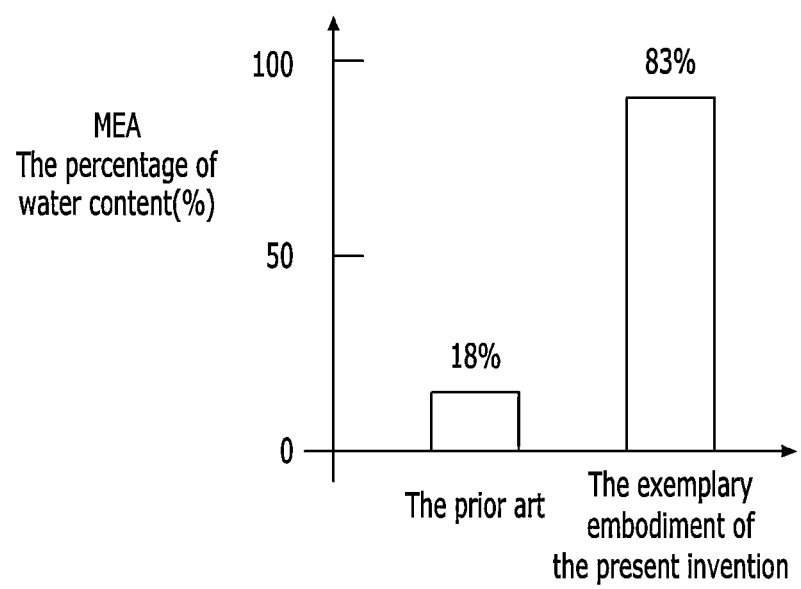
FIGS. 4 and 5 are diagrams for describing an effect of an apparatus for manufacturing fuel cell stack components according to an exemplary embodiment of the present disclosure.

According to an exemplary embodiment of the present disclosure, it is possible to supply moisture to the MEA 1 including a platinum catalyst and an ion conductive polymer film, such as Nafion, when the MEA 1 and the GDLs 3 are thermally compressed by the hot plates 41, thereby considerably decreasing a time and cost for an additional activation process due to evaporation and loss of the moisture of the MEA 1 in the existing thermal compression process. That is, the steam supplied to the MEA 1 when it is manufactured increases the percentage of water content of the MEA 1 up to about fourfold, compared to the prior art as shown in FIG. 4.

Figure 5:
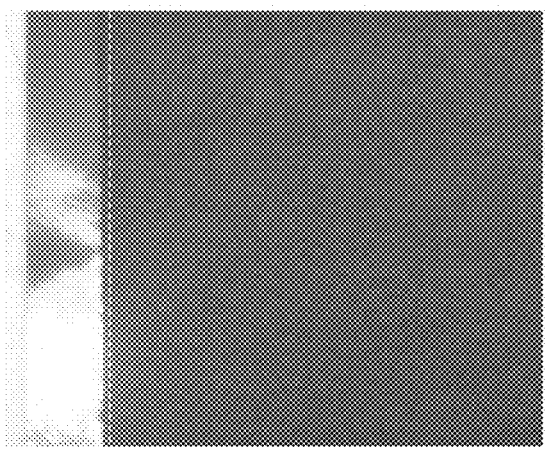
Figure 5:
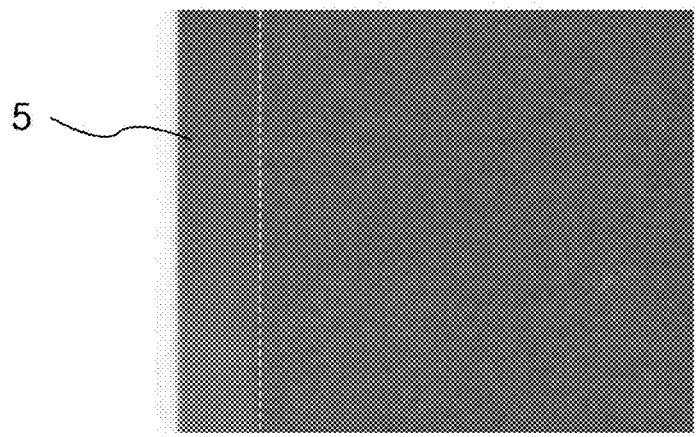

Referring to FIG. 5, the steam of the moisture according to an exemplary embodiment of the present disclosure is supplied to the surfaces of the sub gaskets 5 of the MEA 1 when the MEA 1 and the GDLs 3 are thermally compressed by the hot plates 41, thus preventing the surfaces of the sub gaskets 5 from being deformed in a wrinkle shape while being contracted.

Since the wrinkle on the surfaces of the sub gaskets 5 can be prevented in an exemplary embodiment of the present disclosure, a leak generation rate of reacted gas can be remarkably decreased due to the wrinkle portion, and thus increasing a performance stability of the fuel cell stack.

Figure 6:
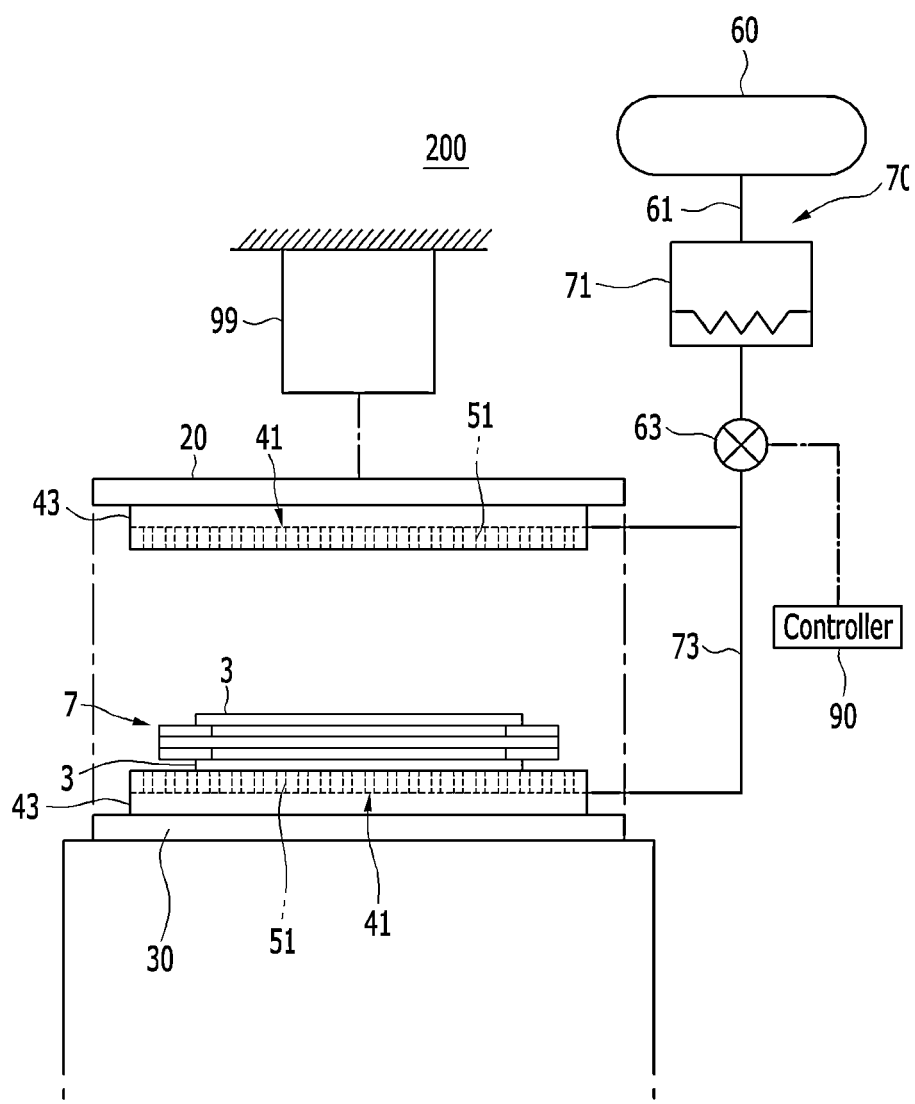
FIG. 6 is a diagram schematically illustrating an apparatus for manufacturing fuel cell stack components according to another exemplary embodiment of the present disclosure.

FIG. 6 is a diagram schematically illustrating an apparatus for manufacturing fuel cell stack components according to another exemplary embodiment of the present disclosure. In FIG. 4, the same reference numerals as those of the aforementioned exemplary embodiment designate the same elements.

Referring to FIG. 6, an apparatus 200 for manufacturing fuel cell stack components according to another exemplary embodiment of the present disclosure may include the same structure of the aforementioned exemplary embodiment, and may include a steam generator 70 generating steam by heating ultra-pure water and supplying the generated steam to steam nozzle holes 51 of hot plates 41 when GDLs 3 and an MEA basic material 7 are compressed by the hot plates 41.

That is, according to another exemplary embodiment of the present disclosure, the steam generator 70 is capable of separately evaporating the ultra-pure water, and supplying the evaporated steam to the steam nozzle holes 51 of the hot plates 41.

The steam generator 70 includes a storage tank 60 for storing ultra-pure water, a heater 71 for generating steam by receiving the ultra-pure water stored in the storage tank 60, and a steam supply line 73 supplying the steam generated by the heater 71 to the steam nozzle holes 51 of the hot plates 41.

Here, the storage tank 60 and the heater 71 are connected through the ultra-pure water supply line 61, and the heater 71 may be a heating device having a boiler structure receiving the ultra-pure water from the storage tank 60 through the ultra-pure water supply line 62 and evaporating the ultra-pure water.

The steam supply line 73 connects a steam discharge side of the heater 71 and housings 43 of the hot plates 41. Further, an opening/closing valve 63 operated by an electrical signal provided from a controller 90 is installed in the steam supply line 73.

The opening/closing valve 63 may open the steam supply line 73 through the controller 90 when the MEA basic material 7 and the GDLs 3 are compressed by the hot plates 41 of upper and lower dies 20 and 30 while the upper die 20 moves down toward the lower die 30.

Further, the opening/closing valve 63 may close the steam supply line 73 through the controller 90 when the MEA basic material 7 and the GDLs 3 are completely compressed at a high temperature by the hot plates 41 and then the upper die 20 moves up.

According to the apparatus 200 for manufacturing the fuel cell stack components according to another exemplary embodiment of the present disclosure, which is configured as described above, the opening/closing valve 63 closes the steam supply line 73 by receiving the electrical signal from the controller 90 in a state where the upper die 20 moves in an upper direction.

Further, the opening/closing valve 63 opens the steam supply line 73 by receiving the electrical signal from the controller 90 when compressing the MEA basic material 7 and the GDLs 3 through the hot plates 41 while the upper die 20 moves down toward the lower die 30 by a driving unit 99.

According to an exemplary embodiment of the present disclosure, it is possible to inject the steam to the GDLs 3 and the MEA basic material 7 through the steam nozzle holes 51 by supplying the steam to the steam nozzle holes 51 of the hot plates 41 from the heater 71 through the steam supply line 73 when compressing the GDLs 3 and the MEA basic material 7 with the hot plates 41 of the upper die 20 and the lower die 30 at the high temperature.

Since the remaining configurations and operational effects of the apparatus 200 for manufacturing the fuel cell stack components according to another exemplary embodiment of the present disclosure are the same as those of the aforementioned exemplary embodiment, more detailed descriptions thereof will be omitted.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An apparatus for manufacturing fuel cell stack components for integrally bonding gas diffusion layers to both surfaces of a membrane-electrode assembly (MEA) basic material, the MEA basic material having an MEA and sub gaskets, the apparatus comprising:
    a frame;
    an upper die disposed on the frame to be movable in a vertical direction;
    a lower die disposed on the frame, and configured to support the MEA basic material and the gas diffusion layers at a lower side of the upper die;
    bonders disposed at each of the upper die and the lower die and configured to compress the MEA basic material and the gas diffusion layers at a high temperature and a high pressure;
    steam injectors disposed in the bonders and configured to inject steam to the MEA basic material and the gas diffusion layers; and
    an ultra-pure water storage tank configured to store ultra-pure water for generating steam to the bonders, and to supply the ultra-pure water to the bonders.

2. The apparatus of claim 1, wherein the ultra-pure water storage tank supplies the ultra-pure water to a high temperature portion of each of the bonders, and the steam injectors injects steam evaporated from the high temperature portion.

3. The apparatus of claim 1, wherein the bonders include hot plates configured to compress the gas diffusion layers to both surfaces of the MEA basic material.

4. The apparatus of claim 3, wherein the steam injectors include a plurality of steam nozzle holes formed in the hot plates.

5. The apparatus of claim 4, wherein the ultra-pure water storage tank supplies the ultra-pure water to the hot plates through an ultra-pure water supply line, and the steam injector injects the steam evaporated from the hot plates through the steam nozzle holes.

6. The apparatus of claim 5, wherein an opening/closing valve operated by an electrical signal is installed in the ultra-pure water supply line.

7. An apparatus for manufacturing fuel cell stack components for integrally bonding gas diffusion layers to both surfaces of a membrane-electrode assembly (MEA) basic material having an MEA and sub gaskets, the apparatus comprising:
    a frame;
    an upper die disposed on the frame to be movable in a vertical direction;
    a lower die disposed on the frame, and configured to support the MEA basic material and the gas diffusion layers at a lower side of the upper die;
    bonders disposed at each of the upper die and the lower die, and configured to compress the MEA basic material and the gas diffusion layers at a high temperature and a high pressure;
    steam injectors disposed in the bonders, and configured to inject steam to the MEA basic material and the gas diffusion layers; and
    a steam generator connected to the steam injectors, and configured to generate steam by heating ultra-pure water and supply the generated steam to the steam injectors.

8. The apparatus of claim 7, wherein the bonders include hotplates to compress the gas diffusion layers to both surfaces of the MEA basic material and the steam injector includes a plurality of steam nozzle holes formed in the hot plates.

9. The apparatus of claim 8, wherein the steam generator includes:
    a storage tank to store ultra-pure water;
    a heater to generate steam by receiving the ultra-pure water stored in the storage tank; and
    a steam supply line to supply the steam generated by the heater to the steam nozzle holes of the hot plates.

10. The apparatus of claim 9, wherein an opening/closing valve operated by an electric signal is disposed in the steam supply line.

11. The apparatus of claim 8, wherein the steam nozzle holes are formed at areas of the hot plates, except for an area corresponding to a bonding portion of the sub gaskets and the gas diffusion layers.

* * * * *